United States Patent [19]

Feagan

[11] Patent Number: 4,580,827
[45] Date of Patent: Apr. 8, 1986

[54] PICK-UP BED FORWARD COMPARTMENTATION

[76] Inventor: W. Scott Feagan, 129 NW. Ave. H, Box 278, Hamlin, Tex. 79520

[21] Appl. No.: 692,513

[22] Filed: Jan. 18, 1985

[51] Int. Cl.⁴ .............................................. B60R 11/00
[52] U.S. Cl. .................. 296/37.6; 296/24 R; 224/42.42
[58] Field of Search ............... 296/37.6, 24 R, 1 R; 224/42.42 R

[56] References Cited

U.S. PATENT DOCUMENTS

| | | | |
|---|---|---|---|
| 1,349,959 | 8/1920 | Hoblitt | 296/37.6 |
| 3,664,704 | 5/1972 | Ellis | 296/24 R |
| 4,215,896 | 5/1980 | Drouin | 296/24 R |
| 4,451,075 | 5/1984 | Canfield | 296/37.6 |

Primary Examiner—Robert R. Song
Attorney, Agent, or Firm—Robert M. Hessin

[57] ABSTRACT

Apparatus for use in combination with a straddle-bed tool box to provide large volume secured storage in a pick-up truck. The apparatus consists of opposite side angle brackets secured to bed side rails to provide rotary support for a closure panel that extends across the pick-up bed. A vertical panel is also secured to extend across the bed as the closure panel may be lockably affixed to the vertical panel to secure the storage volume forward therefrom.

7 Claims, 5 Drawing Figures

PICK-UP BED FORWARD COMPARTMENTATION

BACKGROUND OF THE INVENTION

1. Field of the Invention

The present invention relates to pick-up bed compartmentation and, more particularly, but not by way of limitation, to forward bed compartmentation and securing structure that enables a much greater volume of protected storage space when used in combination with the conventional straddle-bed pick-up compartment.

2. Description of the Prior Art

The straddle-bed compartment for pick-up beds is, of course, well-known and commercially available in any of a great number of different design variations, all being of the same similar structure. That is, the compartment is generally adapted for affixure across the sidewalls at the forward end of the pick-up bed compartment for disposition in elevation off the bed floor, and such compartments usually have oppositely facing, top-mounted doors for securing the enclosure. While many of the other haulage bed compartmentation schemes have been known in the prior art down through the years, there is none that embodies the particular structural characteristics of the present invention, and there is particularly no such prior teaching of compartmentation structure for use in combination with straddle-bed compartments to enlarge the total security space.

Pre-examination search reveals patent art of only mild interest as evidenced by a very early U.S. Pat. No. 584,167 in the name of Shanklin which teaches a front vertical door and angularly oriented upper door for affixure to a wagon to provide a basic compartmentation structure. U.S. Pat. No. 3,940,009 to Szeles discloses a truckbox with top lid and compartmentation for storage of tire and other large tools and supplies. The patent to Parker et al, U.S. Pat. No. 3,640,423, illustrates yet another form of cross-bed pick-up toolbox of the type which is well-known today. Finally, U.S. Pat. Nos. 4,266,835; 4,451,075; and 4,215,896 each provide teachings of pick-up bed toolboxes of the type having a slanted rearward face; however, each of these teachings is directed to a toolbox for affixure across the rear end of the pick-up so that the pick-up bed tailgate also functions as the locking door.

SUMMARY OF THE INVENTION

The present invention relates to compartmentation structure for use in combination with a conventional straddle-bed pick-up storage box to provide a much increased volume of secure, lockable storage. More particularly, the compartmentation structure consists of side brackets securable on each side on top of the pick-up bed side panels to hingedly support a cover panel contiguous to the rear side of the associated storage box. The cover panel then coacts with a vertical compartment panel that is secured between the opposite fender housings across the bottom of the pick-up bed. The closure panel may be affixed as by locking to the vertical panel thereby to provide a storage space of much increased volume.

Therefore, it is an object of the present invention to provide pick-up bed storage compartment structure that greatly increases the amount of lockable storage space.

It is yet another object of the invention to enable a much increased storage space by combining lockable panel structure with a conventional saddle-bed pick-up storage box.

It is yet another object of the invention to provide a securable storage space in a pick-up bed for protection of such as spare tire, shovels and large hand tools, heavy chains and other cumbersome operating equipment.

Finally, it is an object of the present invention to provide relatively simple and inexpensive panel equipment or installation in a pick-up bed to enable much increased volume of security storage space.

Other objects and advantages of the invention will be evident from the following detailed description when read in conjunction with the accompanying drawings which illustrate the invention.

DETAILED DESCRIPTION OF THE INVENTION

Figure 1:
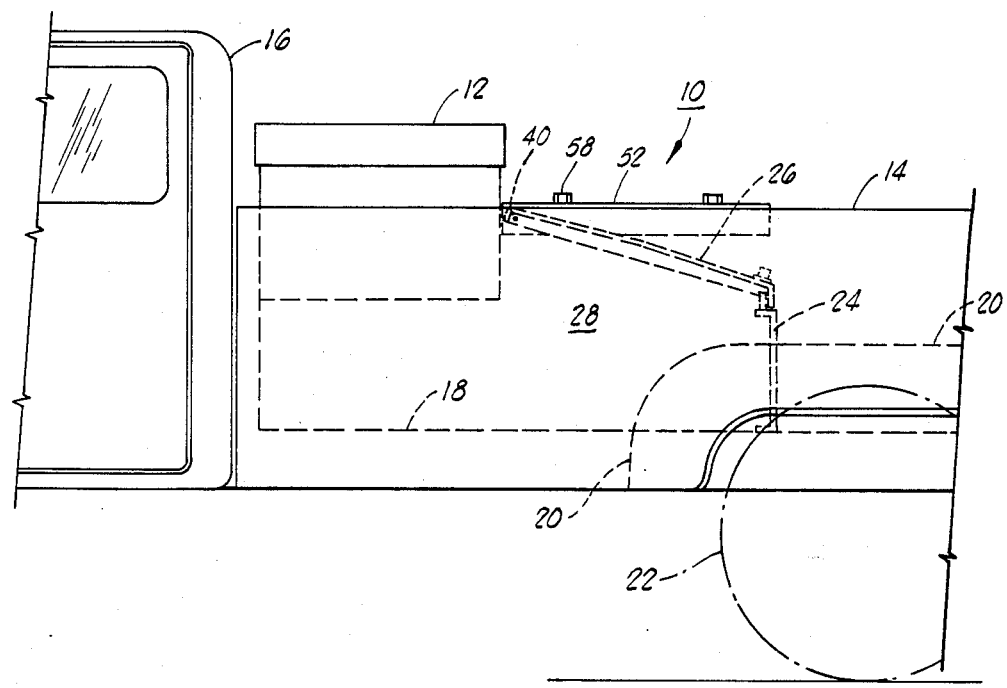
FIG. 1 is a partial side view in elevation of a pick-up truck bed as it would include a straddle-bed storage box (prior art) in combination with a storage compartment constructed in accordance with the present invention.
Figure 2:
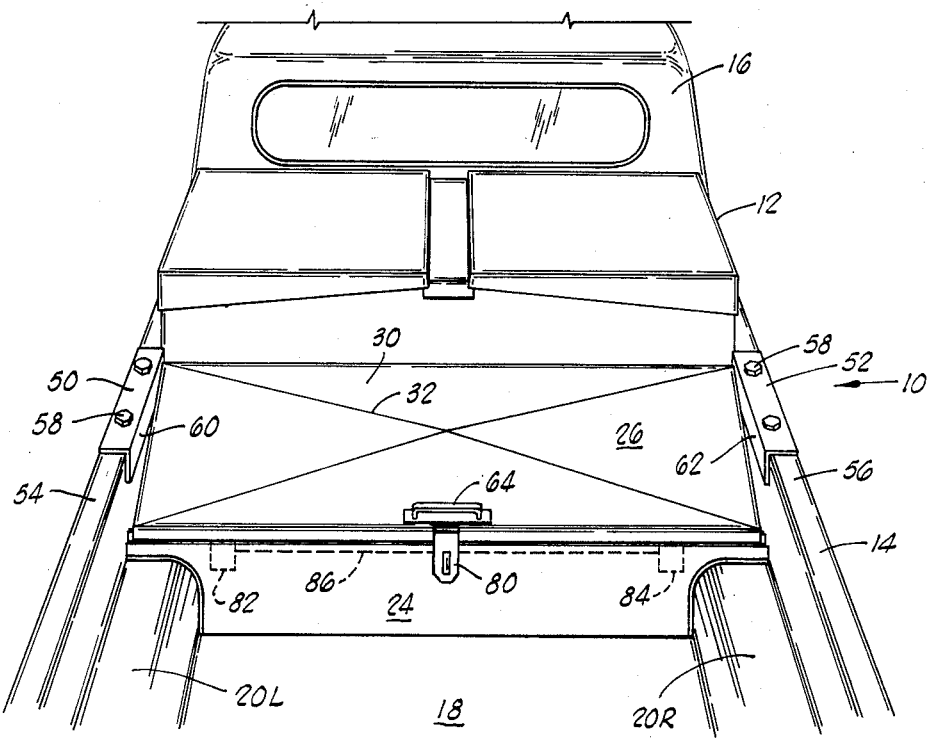
FIG. 2 is a perspective view from the rear of the storage compartment of the present invention as installed.

Referring to FIGS. 1 and 2, a bed compartment 10 is illustrated in combination with a straddle-bed tool box 12 as secured in the bed 14 of a pick-up truck 16. The pick-up bed 14 is of standard configuration having side panels, a floor 18, and left and right wheel housings 20 over respective rear wheels 22. The compartment 10 structure consists of a transverse vertical panel 24 in coaction with a hinged lid or closure panel 26 to provide secure, lockable space 28 extending forward beneath the associated toolbox 12.

Figure 3:
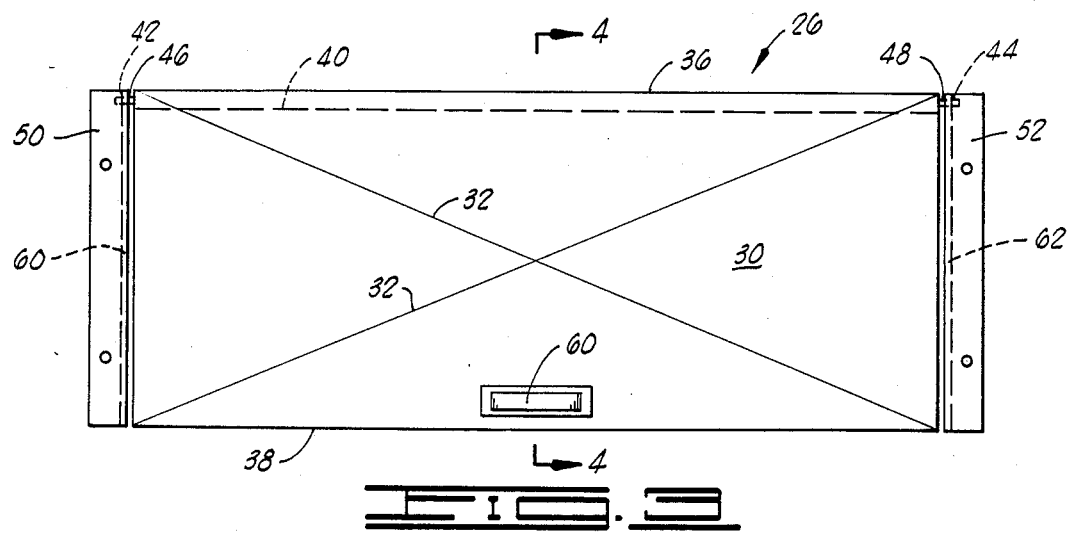
FIG. 3 is a top plan view of compartment closure panel structure of the present invention.
Figure 4:
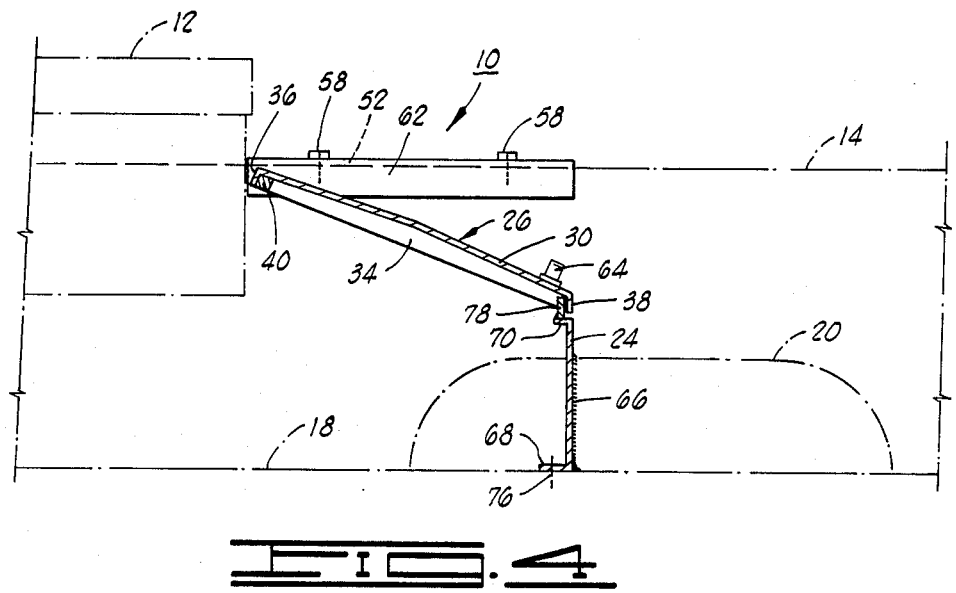
FIG. 4 is a side elevation in section of the compartment structure of FIG. 1 with pick-up bed shown in phantom.

As shown also in FIGS. 3 and 4, the closure panel 26 consists of a unitarily formed panel 30 having such as crown breaks 32 for rigidizing the panel. Panel 30 is further formed with abbreviated side lips 34 and the front and closure lips 36 and 38, respectively, these also serving to rigidize the closure panel 26. A support bar 40 is secured as by welding across the forward edge of panel 30 adjacent to the forward lip 36. Support bar 40 in present design is of square stock, relatively heavy dimension, and rounded at each end to form a hinge spindle portion 42 and 44, respectively. The spindle portions 42 and 44 are then engaged in respective holes 46 and 48 of side angle brackets 50 and 52.

As shown in FIGS. 1 and 2, the side angle brackets 50 and 52 are secured on the respective pick-up bed side panels 54 and 56 by a plurality of bolts or like fasteners 58. Angle brackets 50 and 52 each subtend their respective angle plates 60 and 62 downward beneath the top rail or surface of the respective side panels 54 and 56 so that the closure panel 26 is arcuately movable about spindles 42 and 44, as it may be manipulated by a handle 64.

Figure 5:
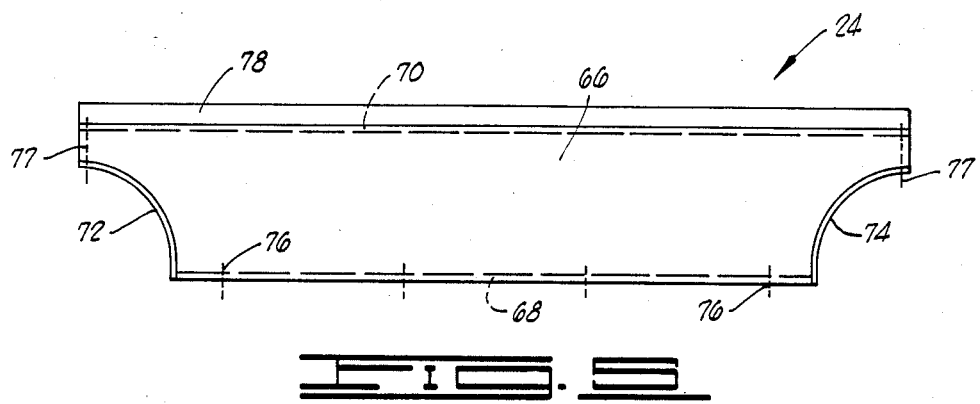
FIG. 5 is a view in elevation of a vertical panel of the present invention.

The vertical panel 24 is formed, as shown in FIGS. 5 and 6, as a generally rectangular panel having sufficient width to span the pick-up bed. Thus, vertical panel 24 consists of a panel 66 formed with a lower flange 68 and an upper flange 70 with oppositely disposed 90° sector cut-outs 72 and 74. The sector cut-outs 72 and 74 are each adapted to be tightly received around respective opposite rear wheel housings 20 as lower flange 68 is secured as by plural fasteners 76 to the pickup bed floor 18. Fasteners and spacers 77 may also be utilized to secure end portions of flange 78 through opposite wheel housings 20. The sector cut-outs 72 and 74 are preferably rolled to provide secure and attractive fit around the wheel wells while also increasing vertical rigidity. A transverse bar 78 is secured as by welding along the upper surface of upper flange 70 to provide a facing for engagement with the closure lips 38 of closure panel 26. The facing bar 78 is disposed in planar offset to panel 66, as shown in FIG. 4.

A locking mechanism may be included with handle 64, either an internally locking mechanism or a lock and hasp 80 (see FIG. 2) in combination with a selected lock. Still further, pneumatic shocks or other closure devices may be secured to provide more complete control of opening and closing of the closure panel 26. Still further, and as shown alternatively in FIG. 2, a more secure locking mechanism may consist of opposite side locking means 82 and 84 as coordinated by a tie bar 86. This type of lock decreases likelihood of unwarranted entry through prying.

In present construction, the closure panel 26 and vertical panel 24 are each formed from such as 14 gauge steel, each being of generally unitary formation, and bar 78 may be such as a three-quarter inch by one-eighth inch bar. The angle brackets 50 and 52 may be formed from stock angle iron, e.g. three inch by three inch by three-sixteenth inch thickness. However, it should be understood that the entire compartmentation structure may be formed from fiberglass or other molding plastics.

The foregoing discloses a novel compartment structure for installation in a pick-up bed in combination with a straddle-bed toolbox to provide a much increased volume of secure storage space. The bed compartment structure provides an increased volume of lockable storage wherein large implements such as jacks, shovels, spare tire, chains and other large hand tools may be safely carried and maintained under security protection. It should be understood too that the longitudinal positioning of the vertical panel may be varied with attendant change in size of the closure panel thereby to enable a wide variation in total security storage volume.

Changes may be made in combination and arrangements as heretofore set forth in the specification and shown in the drawings; it being understood that changes may be made in the embodiments disclosed without departing from the spirit and scope of the invention as defined in the following claims.

What is claimed is:

1. Apparatus for storage compartmentation in combination with a straddle-bed security box in a pickup bed having floor and first and second side panels, comprising:
    vertical panel means having a top and bottom flanged surface, said bottom surface being secured to the bed floor as the panel extends transversely between first and second side panels, and including a planar offset closure bar secured horizontally across said top surface;
    first and second bracket means secured on top of respective first and second side panels contiguous to said security box; and
    closure panel means hingedly affixed to each of said first and second bracket means and extending a closure lip portion for lockable capture over said vertical panel means closure bar, said panel means serving to open and close the storage compartmentation volume forward of the vertical panel and extending beneath said straddle-bed security box.

2. Apparatus as set forth in claim 1 which further includes:
    first and second arcuate sectors formed on each lower side of said vertical panel means to enable tight affixure over pick up bed wheel housings while still maintaining complete compartmentation between said first and second side panels.

3. Apparatus as set forth in claim 1 wherein said closure panel means comprises:
    a unitarily formed, rectangular panel having forward lip and closure lip portions formed on opposite parallel sides as downwardly turned flanges;
    a support bar secured across said panel contiguous to said forward lip, said support bar being formed to include hinge spindles on opposite ends for rotary support within said first and second bracket means.

4. Apparatus as set forth in claim 2 wherein said closure panel means comprises:
    a unitarily formed, rectangular panel having forward lip and closure lip portions formed on opposite parallel sides as downwardly turned flanges;
    a support bar secured across said panel contiguous to said forward lip, said support bar being formed to include hinge spindles on opposite ends for rotary support within said first and second bracket means.

5. Apparatus as set forth in claim 3 wherein each of said first and second bracket means comprise:
    a unitarily formed ninety degree angle iron wherein one side includes holes for affixure to the respective side panel top and the ninety degree bent side includes a hinge support hole for retaining the respective support bar hinge spindle.

6. Apparatus as set forth in claim 5 which further includes:
    roll-edged first and second arcuate sectors formed on each lower side of said vertical panel means to enable tight affixure over pick up bed wheel housings while still maintaining complete compartmentation between said first and second side panels.

7. Apparatus as set forth in claim 1 which further includes:
    handle and lock means secured to said closure panel means to enable locked affixure to said vertical panel means.

* * * * *